(12) United States Patent
Miller

(10) Patent No.: US 6,962,354 B1
(45) Date of Patent: Nov. 8, 2005

(54) EQUIPMENT TRANSPORTATION SYSTEM

(76) Inventor: Michael T. Miller, 5848 NW. Whitecap Rd., Port St. Lucie, FL (US) 34986

( * ) Notice: Subject to any disclaimer, the term of this patent is extended or adjusted under 35 U.S.C. 154(b) by 22 days.

(21) Appl. No.: 10/601,373

(22) Filed: Jun. 23, 2003

(51) Int. Cl.$^7$ .............................................. B62B 1/00
(52) U.S. Cl. .................................. 280/47.26; 43/54.1
(58) Field of Search ...................... 280/47.26, 47.31, 280/47.34, 47.35, 47.19, 79.2, 652; 248/98, 248/129; 232/43.2; 43/54.1; 206/315.11; D34/25

(56) References Cited

U.S. PATENT DOCUMENTS

| | | | | |
|---|---|---|---|---|
| 3,897,080 A | * | 7/1975 | Isom | 280/47.19 |
| 5,159,777 A | * | 11/1992 | Gonzalez | 43/54.1 |
| 5,203,815 A | * | 4/1993 | Miller | 43/21.2 |
| 5,333,885 A | * | 8/1994 | Pullman | 280/47.19 |
| D378,456 S | * | 3/1997 | Speicher | D34/25 |
| 5,641,170 A | * | 6/1997 | Helm | 280/30 |
| D391,033 S | * | 2/1998 | Harris | D34/25 |
| 5,899,467 A | * | 5/1999 | Henkel | 280/47.25 |
| 5,988,657 A | * | 11/1999 | Henkel | 280/47.25 |
| 6,082,757 A | * | 7/2000 | Lin | 280/654 |
| 6,550,791 B2 | * | 4/2003 | Ramsey | 280/47.19 |

* cited by examiner

Primary Examiner—Bryan Fischmann
(74) Attorney, Agent, or Firm—Edward P. Dutkiewicz

(57) ABSTRACT

A frame is fabricated of rigid material. The frame has a plurality of cross members and a plurality of wheels. A cooler is mounted to the frame. The frame further has a handle.

2 Claims, 4 Drawing Sheets

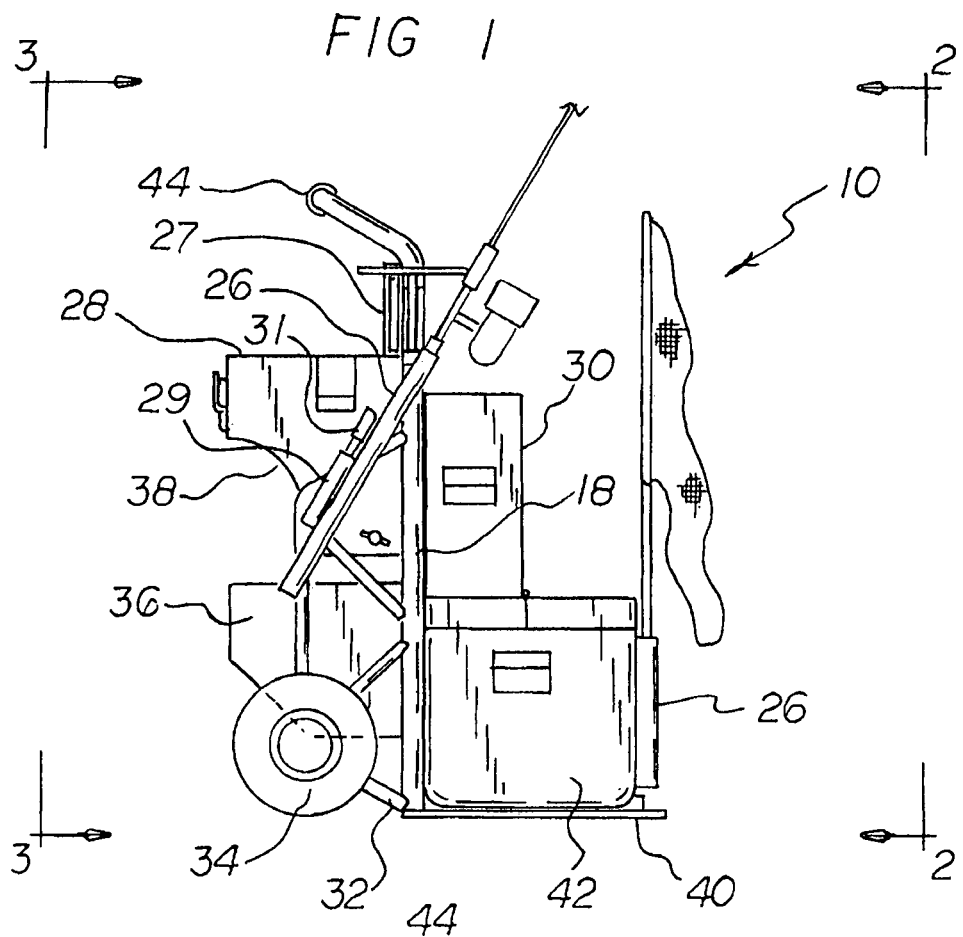
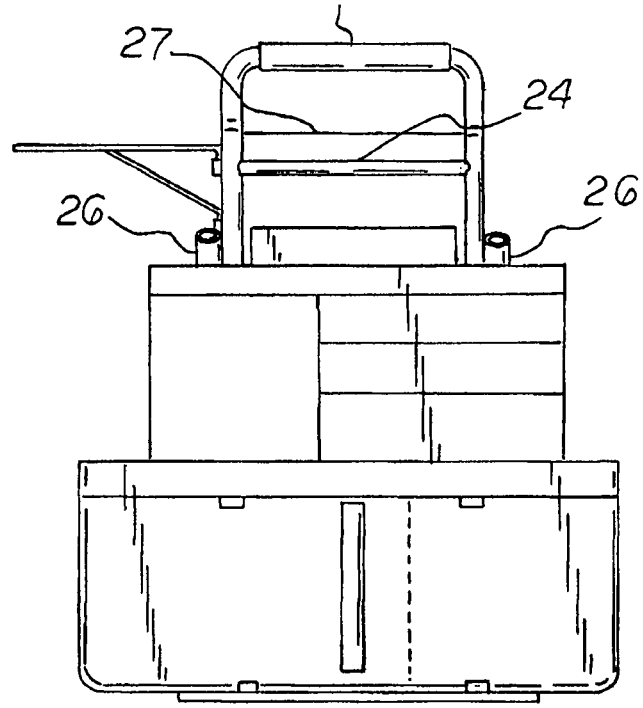

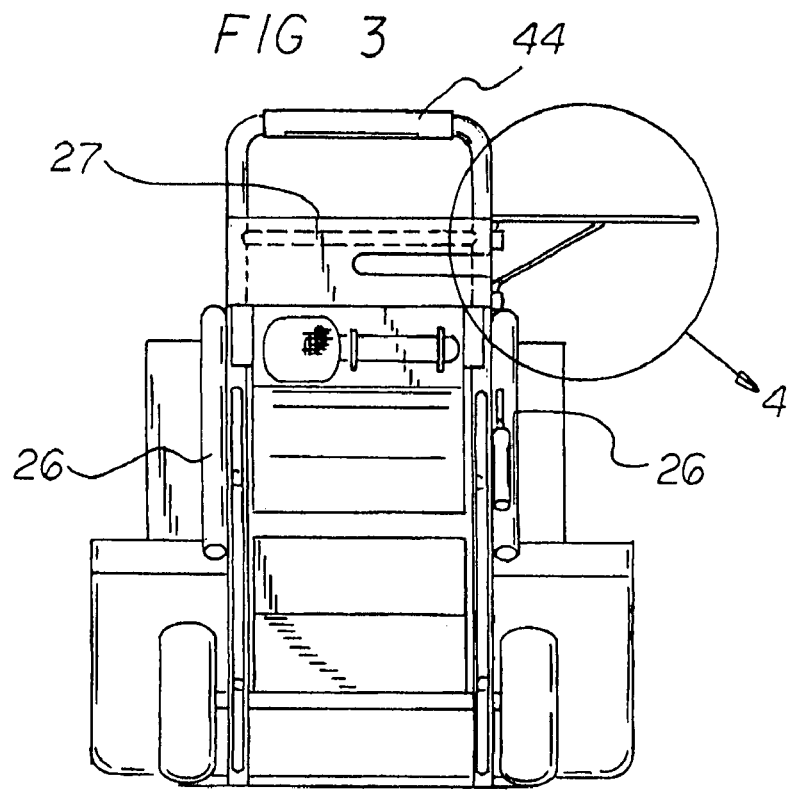
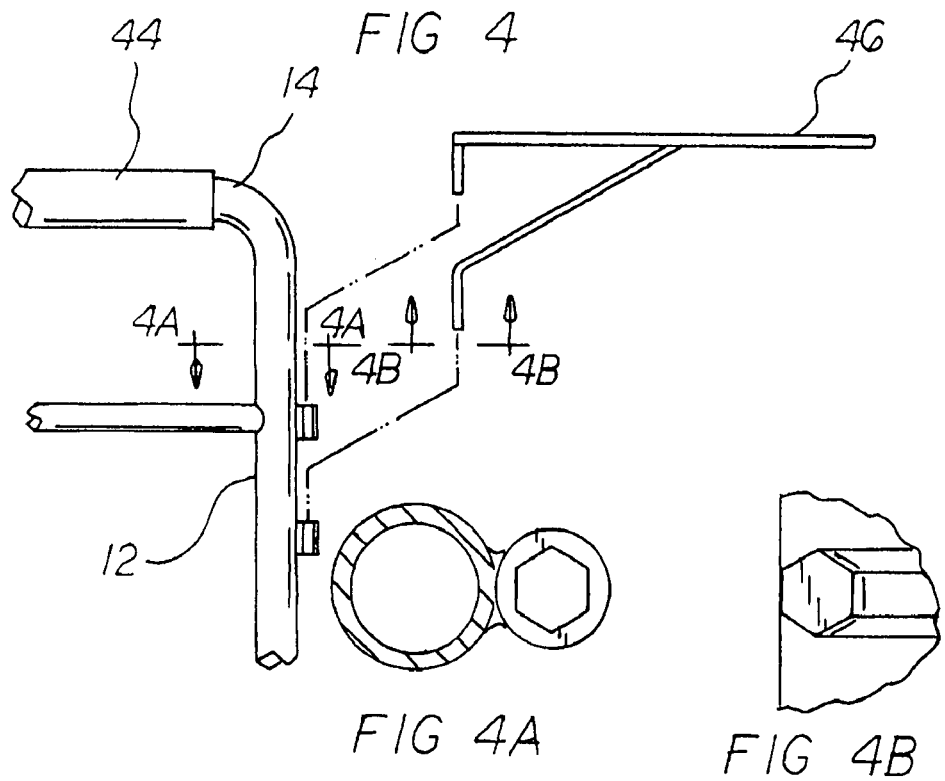

EQUIPMENT TRANSPORTATION SYSTEM

BACKGROUND OF THE INVENTION

1. Field of the Invention

The present invention relates to an equipment transportation system and more particularly pertains to allowing a user to move sporting equipment with ease.

2. Description of the Prior Art

The use of transportation systems of known designs and configurations is known in the prior art. More specifically, transportation systems of known designs and configurations previously devised and utilized for the purpose of transporting equipment through conventional methods and apparatuses are known to consist basically of familiar, expected, and obvious structural configurations, notwithstanding the myriad of designs encompassed by the crowded prior art which has been developed for the fulfillment of countless objectives and requirements. The following listed patents are by way of example.

| Patent No. | Issue Date | Inventor | Title |
| --- | --- | --- | --- |
| 4,195,777 | Nov. 3, 1992 | Gonzalez | Fishing Cart Apparatus |
| 5,333,885 | Aug. 2, 1994 | Pullman | Fishing Cart Apparatus |
| 5,340,135 | Aug. 23, 1994 | Womberly | Hand Truck for Fishing Equipment |
| 5,611,561 | Mar. 18, 1997 | Dale, II | Fishing Cart System |
| 6,082,757 | Jul. 4, 2000 | Lin | Folding Collapsible Fishing Cart |

While these devices fulfill their respective, particular objectives and requirements, the aforementioned patents do not describe an equipment transportation system that allows a user to move sporting equipment with ease.

In this respect, the equipment transportation system according to the present invention substantially departs from the conventional concepts and designs of the prior art, and in doing so provides an apparatus primarily developed for the purpose of allowing a user to move sporting equipment with ease.

Therefore, it can be appreciated that there exists a continuing need for a new and improved equipment transportation system which can be used for allowing a user to move sporting equipment with ease. In this regard, the present invention substantially fulfills this need.

SUMMARY OF THE INVENTION

In view of the foregoing disadvantages inherent in the known types of transportation systems of known designs and configurations now present in the prior art, the present invention provides an improved equipment transportation system. As such, the general purpose of the present invention, which will be described subsequently in greater detail, is to provide a new and improved equipment transportation system and method which has all the advantages of the prior art and none of the disadvantages.

To attain this, the present invention essentially comprises a frame. The frame is fabricated of rigid material. The frame has an upper end, a lower end and a middle portion. The frame further has a forward side and a rearward side. The middle portion has a plurality of cross members. The middle portion has a plurality of tubular fishing rod holders. The middle portion also has an electrically powered live-well for bait fish. The middle portion further has a forwardly projecting flat load-carrying portion. A tackle box is coupled to the forwardly projecting flat load-carrying portion. The lower end of the frame has rearwardly projecting wheel mounting portions. The wheel mounting portions have a plurality of wheels. The rearwardly projecting wheel mounting portion has a rearwardly attached storage compartment. The powered live-well compartment has a forward end, a rearward end, an upper end and a lower end. The compartment is coupled to the frame. The powered live well has an arcuately configured rearward lower corner. The arcuately configured rearward lower corner facilitates the moving of the system when in the rearwardly tipped position. The lower end of the frame also has a forwardly projecting flat load-carrying portion. A cooler is mounted to the load-carrying portion. The upper end of the frame has an integral handle. The upper end of the frame has an integral collapsible side mounted cutting board. The cutting board is removably mounted to the frame and is pivotable with respect thereto.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved equipment transportation system which has all of the advantages of the prior art transportation systems of known designs and configurations and none of the disadvantages.

It is another object of the present invention to provide a new and improved equipment transportation system which may be easily and efficiently manufactured and marketed.

It is further an object of the present invention to provide a new and improved equipment transportation system which is of durable and reliable constructions.

An even further object of the present invention is to provide a new and improved equipment transportation system which is susceptible of a low cost of manufacture with regard to both materials and labor, and which accordingly is then susceptible of low prices of sale to the consuming public, thereby making such equipment transportation system economically available to the buying public.

Even still another object of the present invention is to provide an equipment transportation system for allowing a user to move sporting equipment with ease.

Lastly, it is an object of the present invention to provide a new and improved equipment transportation system. A frame is fabricated of rigid material. The frame has a plurality of cross members and a plurality of wheels. A cooler is mounted to the frame. The frame further has a handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the equipment transportation system constructed in accordance with the principles of the present invention.

FIG. 2 is a front elevational view taken along line 2—2 of FIG. 1.

FIG. 3 is a rear elevational view taken along line 3—3 of FIG. 1.

FIG. 4 is an exploded view taken along circle 4 of FIG. 3.

FIG. 4A is a bottom view taken along line 4A—4A of FIG. 4.

FIG. 4B is a plan view taken along line 4B—4B of FIG. 4.

The same reference numerals refer to the same parts throughout the various Figures.

DESCRIPTION OF THE PREFERRED EMBODIMENT

Figure 5:
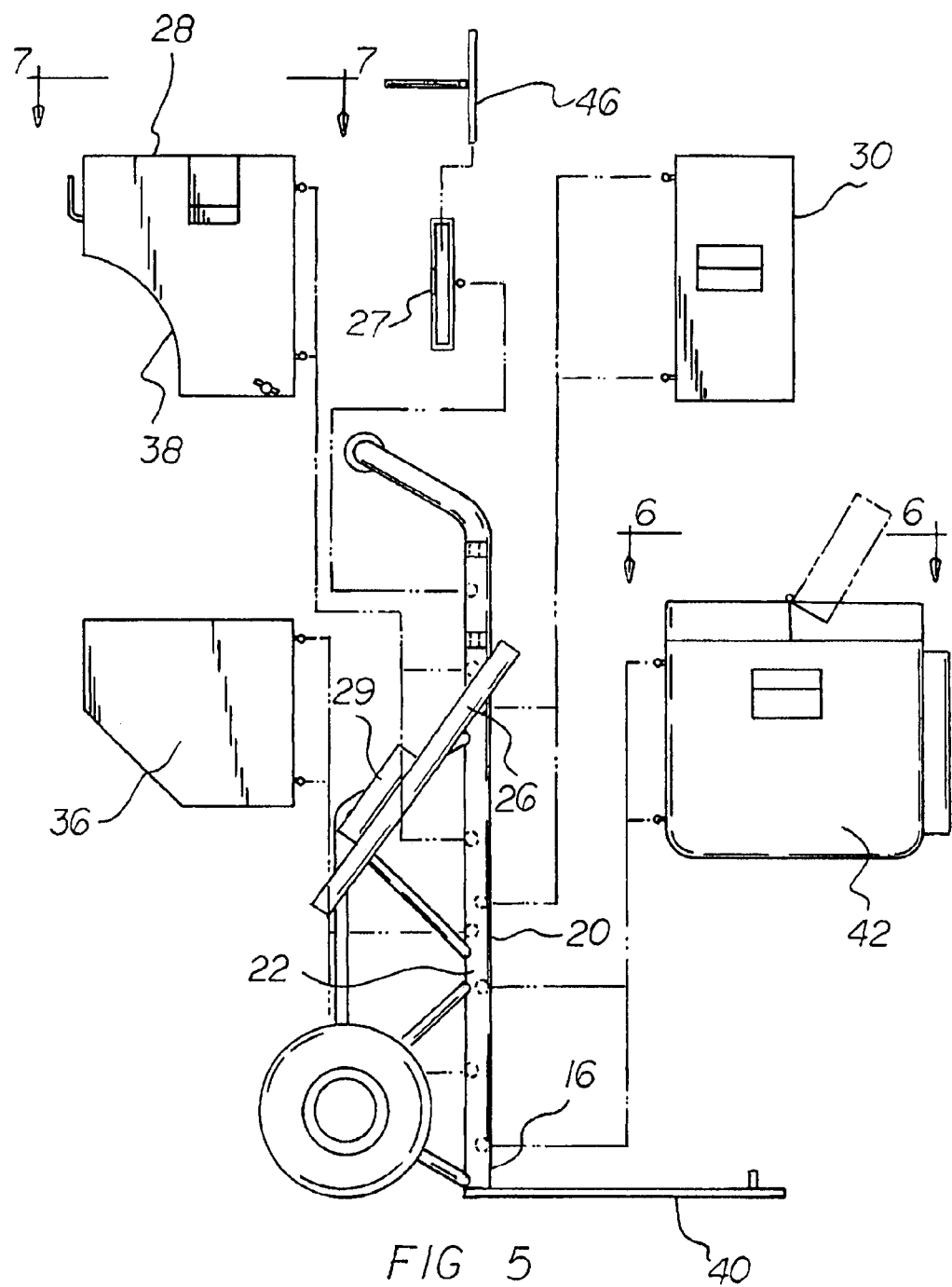
FIG. 5 is an exploded side view of the equipment transportation system of FIG. 1.
Figure 6:
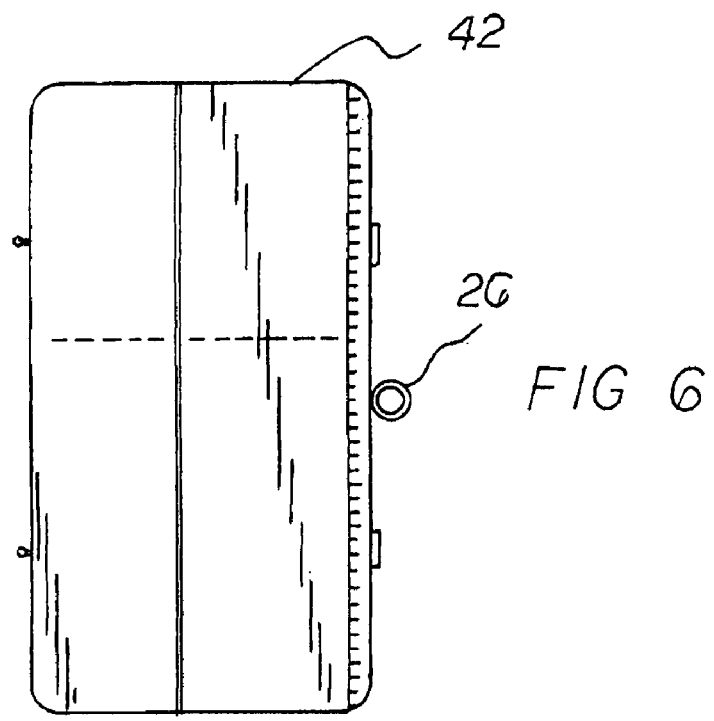
FIG. 6 is a plan view of one component of the system taken along line 6—6 of FIG. 5.
Figure 7:
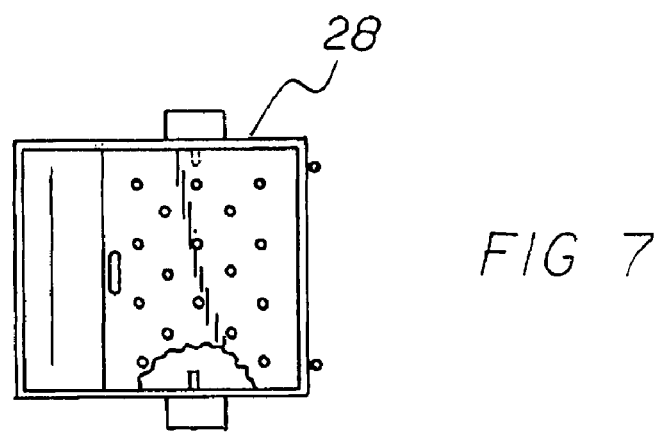
FIG. 7 is a plan view of another component of the system taken along line 7—7 of FIG. 5.

With reference now to the drawings, and in particular to FIG. 1 thereof, the preferred embodiment of the new and improved equipment transportation system embodying the principles and concepts of the present invention and generally designated by the reference numeral 10 will be described.

The present invention, the equipment transportation system 10 is comprised of a plurality of components. Such components in their broadest context include a frame. Such components are individually configured and correlated with respect to each other so as to attain the desired objective.

First provided is a frame 12. The frame is fabricated of rigid material. The frame has an upper end 14, a lower end 16 and a middle portion 18. The frame further has a forward side 20 and a rearward side 22. The middle portion has a plurality of cross members 24. The middle portion has a plurality of tubular fishing rod holders 26. The middle portion also has an electrically powered live-well 28 for bait fish and/or shrimp.

A knife is next provided. A holster 29 for the knife 31 is coupled to one of the fishing rod holders. The middle portion further has a forwardly projecting flat load-carrying portion. A tackle box 30 is coupled to the forwardly projecting flat load-carrying portion. The lower end of the frame has rearwardly projecting wheel mounting portions 32. The wheel mounting portions have a plurality of wheels 34. The rearwardly projecting wheel mounting portion has a rearwardly attached storage compartment 36. The storage compartment has a forward end, a rearward end, an upper end and a lower end. The lower rearward corner has an angled configuration to facilitate moving the system on its wheels when tipped. The storage compartment is coupled to the frame.

A cutting board holster 27 is coupled to the rearward side of the upper end of the frame. The powered live-well has an arcuately configured rearward lower corner 38. The arcuately configured rearward lower corner 38 facilitates access by a user to the storage compartment there beneath.

The lower end of the frame also has a forwardly projecting flat load-carrying portion 40. A cooler 42 is mounted to the load-carrying portion. The upper end of the frame has an integral handle 44. The upper end of the frame has an integral collapsible side mounted cutting board 46. The cutting board is removably mounted 48 to the frame and is pivotable with respect thereto.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An equipment transportation system for allowing a user to move sporting equipment with ease, comprising, in combination:

a frame fabricated of rigid material having an upper end and a lower end and a middle portion and a forward side and a rearward side, the middle portion having a plurality of cross members and a plurality of tubular fishing rod holders and an electrically powered live-well for bait fish and a forwardly projecting flat load-carrying portion with a tackle box coupled there to, a knife to be placed within a holster coupled to one of the fishing rod holders, the lower end of the frame having rearwardly projecting wheel mounting portions with a plurality of wheels and a rearwardly attached storage compartment having a forward end and a rearward end and an upper end and a lower end, the lower rearward corner has an angled configuration to facilitate moving the system on its wheels when tipped, the storage compartment being coupled to the frame, a cutting board holster coupled to the rearward side of the upper end of the frame, the powered live-well having an arcuately configured rearward lower corner to facilitate access by a user to the storage compartment there beneath, the lower end of the frame also having a forwardly projecting flat load-carrying portion with a cooler mounted thereto, the upper end of the frame having an integral handle and an integral side mounted cutting board with the cutting board being removably mounted to the frame.

2. An equipment transportation system comprising, in combination:

a frame fabricated of rigid material having a plurality of cross members and a plurality of wheels, a live-bait well having an arcuate lower rearward corner to facilitate access by a user to a storage compartment there beneath.

\* \* \* \* \*